(12) United States Patent
Vanka et al.

(10) Patent No.: US 12,191,691 B2
(45) Date of Patent: Jan. 7, 2025

(54) AUXILIARY POWER CASE

(71) Applicant: LENOVO (SINGAPORE) PTE. LTD, Singapore (SG)

(72) Inventors: Mounika Vanka, Durham, NC (US); Saba Shah, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 537 days.

(21) Appl. No.: 17/530,630

(22) Filed: Nov. 19, 2021

(65) Prior Publication Data

US 2023/0163607 A1    May 25, 2023

(51) Int. Cl.
| | |
|---|---|
| *H02J 7/00* | (2006.01) |
| *G06F 1/16* | (2006.01) |
| *H02J 7/34* | (2006.01) |
| *H02J 7/35* | (2006.01) |
| *H02J 50/10* | (2016.01) |
| *H02J 50/80* | (2016.01) |

(52) U.S. Cl.
CPC .......... *H02J 7/0044* (2013.01); *G06F 1/1635* (2013.01); *H02J 7/005* (2020.01); *H02J 7/342* (2020.01); *H02J 7/35* (2013.01); *H02J 50/10* (2016.02); *H02J 50/80* (2016.02); *H02J 2300/24* (2020.01)

(58) Field of Classification Search
CPC .......... H02J 7/0044; H02J 7/005; H02J 50/10; H02J 50/80; H02J 2300/24; G06F 1/1635
USPC ................................ 320/103, 108; 307/104
See application file for complete search history.

(56) References Cited

U.S. PATENT DOCUMENTS

| | | | | |
|---|---|---|---|---|
| 10,291,063 | B1* | 5/2019 | Feare | H02J 7/0044 |
| 2013/0134923 | A1* | 5/2013 | Smith | H02J 7/02 |
| | | | | 320/103 |
| 2015/0364875 | A1* | 12/2015 | Ginsberg | H02J 7/0042 |
| | | | | 320/137 |
| 2019/0148968 | A1* | 5/2019 | Kim | H04B 5/79 |
| | | | | 320/108 |
| 2022/0069595 | A1* | 3/2022 | Yu | G06F 1/1628 |

OTHER PUBLICATIONS

Bingebank, All-In-One Powerbank, BB1 User Guide—EN-R3.0, Mar. 12, 2019 EW (1 page).
Lenovo, Lenovo Services, 3 Year Sealed Battery Warranty, Thinkpad Notebooks (2012) (1 page).
Wireless Power Consortium, Qi Specification, Communications Physical Layer, Version 1.3, Jan. 2021 (20 pages).
Wireless Power Consortium, Qi Specification, Communications Protocol, Version 1.3, Jan. 2021 (137 pages).

* cited by examiner

*Primary Examiner* — Zixuan Zhou
(74) *Attorney, Agent, or Firm* — Brian J. Pangrle (57) ABSTRACT

An auxiliary power case can include a frame; a panel coupled to the frame, where the panel defines at least a portion of a recess; a rechargeable battery disposed at least in part in the recess; and a power interface operatively coupled to the rechargeable battery.

20 Claims, 10 Drawing Sheets

GUI 800

| Trigger to Deliver: | Amps (Q) | Remaining | Temperature |
| --- | --- | --- | --- |
| | App1 | App2 | App3 |
| | Boot | Location | Other |
| Trigger to Charge: | Plugged In | Location | Other |
| Pairing: | Qi Comm. | BT/USB | Other |
| Display/ Notifications: | Time | Power | Other |

AUXILIARY POWER CASE

TECHNICAL FIELD

Subject matter disclosed herein generally relates to auxiliary power for computing devices.

BACKGROUND

A computing device can include a processor, memory accessible by the processor, a housing and a battery.

SUMMARY

An auxiliary power case can include a frame; a panel coupled to the frame, where the panel defines at least a portion of a recess; a rechargeable battery disposed at least in part in the recess; and a power interface operatively coupled to the rechargeable battery. Various other apparatuses, assemblies, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1A:
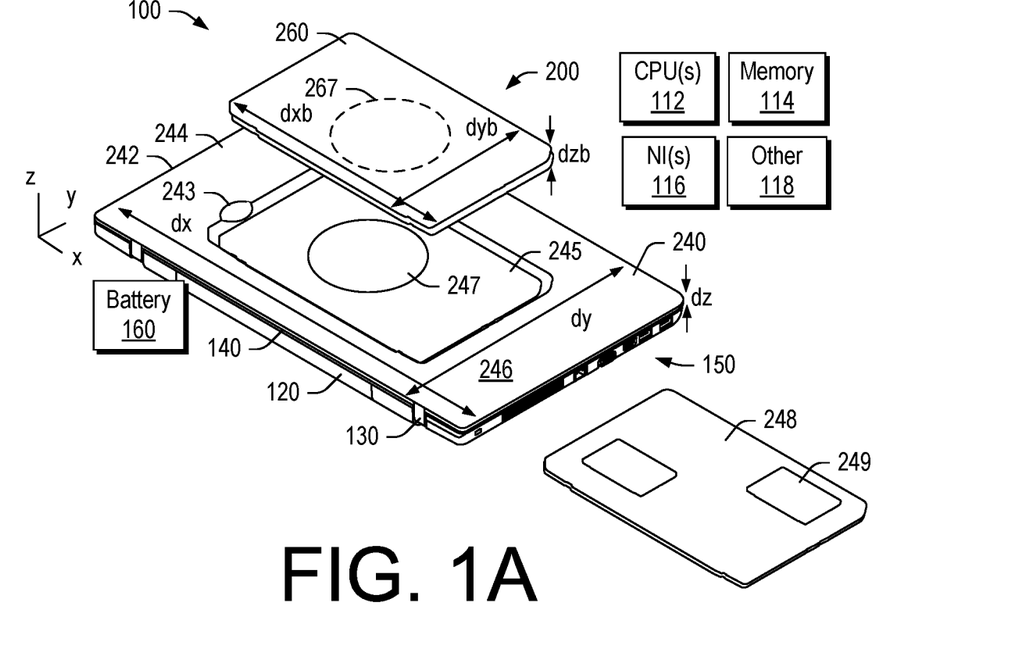
FIG. 1A and FIG. 1B are perspective views of an example of a computing device and an example of an auxiliary power case.
Figure 1B:
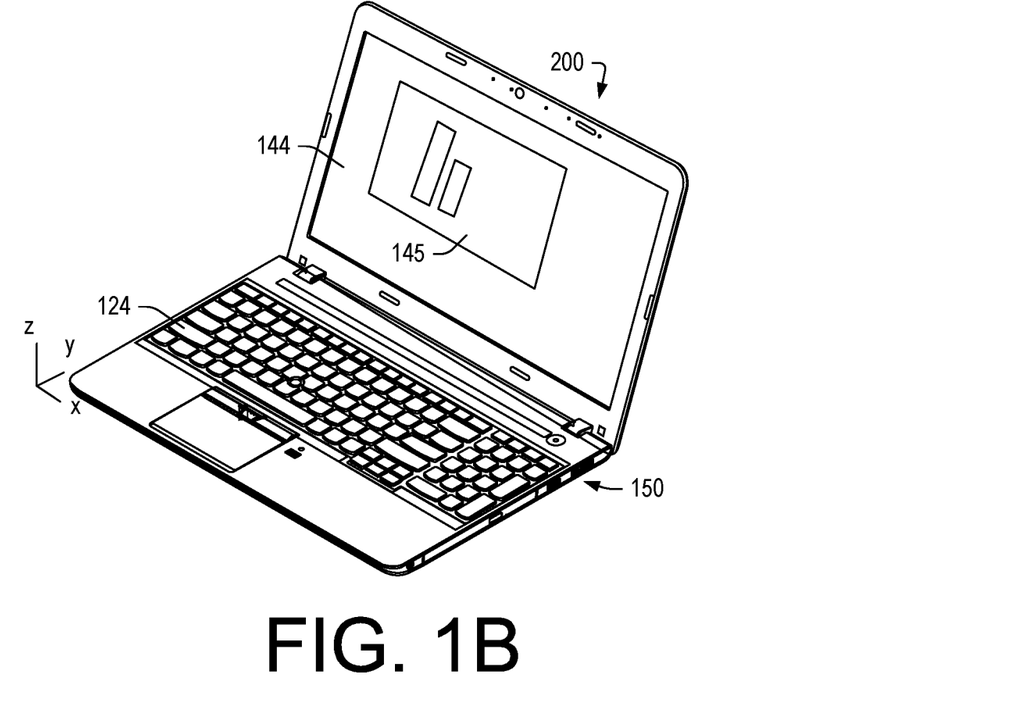

FIG. 1A and FIG. 1B show an example of a computing device 100 and an example of an auxiliary power case 200. As an example, the computing device 100 can include one or more processors 112, memory 114 (e.g., one or more memory devices), one or more network interfaces 116, and one or more other components 118. Such components may be, for example, housed in one or more of a first housing 120 and a second housing 140 where, the first housing 120 and the second housing 140 can be coupled via a hinge assembly 130.

As indicated in FIG. 1A, the computing device 100 can include a battery 160, which can be a rechargeable battery that is disposed within one of the housings 120 and 140. As an example, the battery 160 may be a non-Customer Replaceable Unit (non-CRU) that demands some amount of disassembly of the computing device 100 (e.g., taking apart the housing 140, etc.) or it may be a Customer Replaceable Unit (CRU) that can be uncoupled from one of the housings 120 and 140. As to a CRU, consider one or more manual buttons or latches that can be actuated by a human, optionally in a tool-less manner, to remove the battery 160 and to replace it. In such an example, a portion of a housing may be a part of a replacement battery. As to a non-CRU, it may be recommended to replace the battery 160 at an authorized service center and/or "in the field" (e.g., a Field Replaceable Unit (FRU)) where, for example, a technician can travel to the computing device 100 to replace the battery 160. As an example, a battery may be a sealed battery. For example, consider a non-CRU sealed battery, which may be rated in terms of a number of cycles, a number of years, etc.

As an example, the auxiliary power case 200 may provide for extending lifetime of a battery, whether the battery is a CRU or a non-CRU. For example, as to a non-CRU, consider utilization of the auxiliary power case 200 in a manner that can increase a rating of a 1000 cycle battery by more than 100 cycles or a three year battery by more than 3.6 months. In such examples, the auxiliary power case 200 may be utilized in an intelligent manner as determined via circuitry. For example, consider utilizing one or more triggers that can cause drawing of power from the auxiliary power case 200. As an example, a trigger may be a temperature trigger, a pressure trigger, a current trigger, a voltage trigger, etc. A temperature trigger may aim to manage temperature of a battery, a pressure trigger may aim to manage swelling of a battery, a current trigger may aim to manage one or more chemical reactions that may lead to detrimental conditions, and a voltage trigger may aim to manage one or more chemical reactions that may lead to detrimental conditions.

As an example, the auxiliary power case 200 may be provided integral to the computing device 100 (e.g., integral to the housing 140) or as an add-on component 240 that can be coupled to the computing device 100 (e.g. coupled to the housing 140, etc.).

As shown in FIG. 1A and FIG. 1B, the housing 120 may be a keyboard housing that includes a keyboard 124 and the housing 140 may be a display housing that includes a display 144 that can be operatively coupled to one or more of the processors 112 and utilized for rendering information (e.g., images, graphics, text, etc.). For example, consider a graphical user interface (GUI) 145 that can be rendered to the display 144. As an example, the GUI 145 may provide for rendering of information associated with the battery 160 and/or the auxiliary power case 200. For example, consider a settings GUI, a power utilization GUI, a temperature GUI, a pressure GUI, a battery health GUI, etc.

As shown in FIG. 1A and FIG. 1B, the computing device 100 can include one or more ports or connectors 150. For example, consider one or more serial ports that can be utilized for transmission of data, power or power and data. One or more ports may be positioned on a side of a housing or sides of a housing. In the example of FIG. 1A and FIG. 1B, the housing 120 is shown as including ports on two opposing sides, which may include, for example, one or more universal serial ports (e.g., USB ports).

FIG. 1A also shows a Cartesian coordinate system (x, y and z) that may be utilized to define one or more features of the computing device 100 and/or the auxiliary power case 200. For example, the auxiliary power case 200 can include a surface 246 where the surface 246 can be a substantially planar surface defined via an x,y-plane in a closed orientation of the computing device 100 as shown in FIG. 1A. As shown in FIG. 1A, the surface 246 can be defined by dimensions dx and dy where the housing 140 and/or the auxiliary power case 200 can be defined by a thickness dz.

As an example, a rechargeable battery may be relatively thin (e.g., less than approximately 10 mm) and relatively light (e.g., less than 200 grams). As an example, a rechargeable battery may sit within a recess without extending outwardly therefrom or may extend outwardly therefrom a relatively small distance (e.g., less than approximately 8 mm, etc.). Where a rechargeable battery extends outwardly, it may be more readily contact, for example, along an edge for removal from a recess. As an example, a rechargeable battery may include a grip, which may be a fold-down grip, that can allow for removal of a rechargeable battery from a recess via a finger or fingers (e.g., consider a U-shaped foldable grip, etc.).

As an example, a rechargeable battery may be a flexible pouch type of lithium-ion battery. In such an example, the flexible pouch may include a protective layer, which may help to protect against punctures, leakage, etc. As an example, a rechargeable battery may have a relatively rigid shell (e.g., a protective shell) that may help to reduce risk of punctures, bending damage, leakage, etc. As an example, a rechargeable battery may include a pouch and/or a shell that can allow for some expansion, for example, as may occur under normal operation due to breathing (e.g., expansion and contraction that can occur during cycling, etc.). In such an example, breathing may be greater than 1 percent and less than approximately 15 percent of a total manufactured thickness. For example, consider a recess cover 248 as providing space for breathing, which may be via a clearance, a resilient foam, etc. In such an example, expansion of the battery 260 in the recess 245 may be accommodated without introduction of stress and/or strain to a display such as a flat panel display (e.g., to reduce risk of expansion causing a bulge, etc., in a display surface). As an example, the recess cover 248 can include a release mechanism that can be actuated responsive to force for instances where undesirable expansion of the battery 260 may occur. In such an example, the release mechanism (e.g., magnetic, interference fit, clip, etc.) may release responsive to undesirable swelling force of the battery 260 such that the undesirable swelling force does not deform the auxiliary power case 200 or one or more components of the computing device 100.

As an example, the auxiliary power case 200 can include a frame 242; a panel 244 coupled to the frame 242, where the panel 244 defines at least a portion of a recess 245; a battery 260 disposed at least in part in the recess 245; and a power interface 267 operatively coupled to the battery 260.

In the example of FIG. 1A, the battery 260 can be defined by dimensions dxb, dyb and dzb where the recess 245 can be sized to accommodate the battery 260 (e.g., fully, flush, with a portion extending, etc.). As an example, the battery 260 can have a perimeter that matches a perimeter of the recess 245 where a clearance may exist between the perimeters or an interference fit may be provided by appropriate dimensions of the perimeters; noting that one or more access portions 243 may provide for access.

As an example, one or more magnets may be utilized for holding the battery 260 in the recess 245. For example, consider magnetic materials that can be utilized to assure one or more of proper positioning, electrical interface coupling, securing force such that the battery 260 does not fall out of the recess 245, etc. As an example, an electrical interface, if present, may include spring-loaded elements such as, for example, pogo pins, etc. For example, mating surfaces may be between the battery 260 and one or more surfaces of the recess 245.

As to the power interface 267, it may an electrical interface that can be a wired and/or a wireless interface that can transfer power to the computing device 100. As shown, the battery 260 may be removable from the recess 245 where the recess 245 can include a power interface 247, which can be operatively coupled to circuitry of the computing device 100. As an example, the power interface 247 may be part of the computing device 100. For example, consider one of the housings 120 and 140 as including a built in power interface. As an example, the power interface 247 may be coupled to the computing device 100 via a cable. For example, consider a power cable with a connector that can plug into one or more of the ports 150 of the computing device 100.

As an example, the auxiliary power case 200 can include the recess cover 248, which may include one or more features 249. For example, consider a memory card holder, a display, a touch-sensitive surface, one or more solar cells, etc. As an example, the auxiliary power case 200 can include circuitry that may provide for control and/or interaction with one or more of the one or more features 249. As an example, the auxiliary power case 200 may include communication circuitry such that it can at least receive one or more communication signals from the computing device 100. Such communication circuitry may be operatively coupled to one or more components of the auxiliary power case 200, which, for example, may provide for control of power from and/or to the battery 260.

As an example, the recess cover 248, if included, may be positioned to cover the recess 245 with or without the battery 260 disposed in the recess. As an example, the battery 260 and/or one or more other features of the auxiliary power case 200 may include an indicator that provides status information as to the battery 260 (e.g., amount of charge, discharge rate, remaining time, charging rate, reason for powering the computing device 100, etc.).

As an example, the recess cover 248, if included, may be coupled to the auxiliary power case 200 via an interference fit, a latch, mating features (e.g., key/keyway, etc.), magnets, etc. As an example, the recess cover 248 can include circuitry such as, for example, interface circuitry, display circuitry, etc., which may interact with circuitry of the auxiliary power case 200, a computing device, etc. As an example, the battery 260 can include the recess cover 248, which may be an integral feature or a removable feature of the battery 260. As shown in the example of FIG. 1A, the recess 245 can include one or more access portions 243, for example, to allow for insertion of a finger (e.g., fingertip, fingernail, etc.) to facilitate removal of the battery 260 from the recess 245.

As an example, the computing device 100 and the auxiliary battery case 200 may form a system. For example, consider a system that includes the computing device 100 that includes the battery 160 as a dedicated battery and a first interface where the auxiliary power case 200 includes the frame 242 as removably attachable to one of the housings 120 and 140 of the computing device 100, the battery 260 as a rechargeable battery, control circuitry and a second interface operatively coupled to the rechargeable battery and the control circuitry, where, responsive to a signal transmitted from the first interface to the second interface, the control circuitry energizes the second interface for transmission of power of the rechargeable battery from the second interface to the first interface. In such an example, the first and second interfaces may be wired and/or wireless. As an example, a wireless approach may utilize the Qi standard.

While FIG. 1A and FIG. 1B show the computing device 100 as including the two housings 120 and 140, the housing 140 may be separable from the housing 120 and be utilized as a tablet (e.g., a tablet mode). As an example, the auxiliary power case 200 may be suitable for use with a tablet form factor computing device and/or a notebook form factor computing device.

In the example of FIG. 1A, the auxiliary power case 200 can include a frame 242 where the surface 246 is a surface of a panel 244 coupled to the frame 242 (e.g., as separate pieces, as integrally formed via machining, molding, etc.), where the panel 244 defines at least a portion of the recess 245; where the battery 260 is a rechargeable battery disposed at least in part in the recess 245; and the power interface 267 being operatively coupled to the battery 260 as a rechargeable battery.

Figure 2:
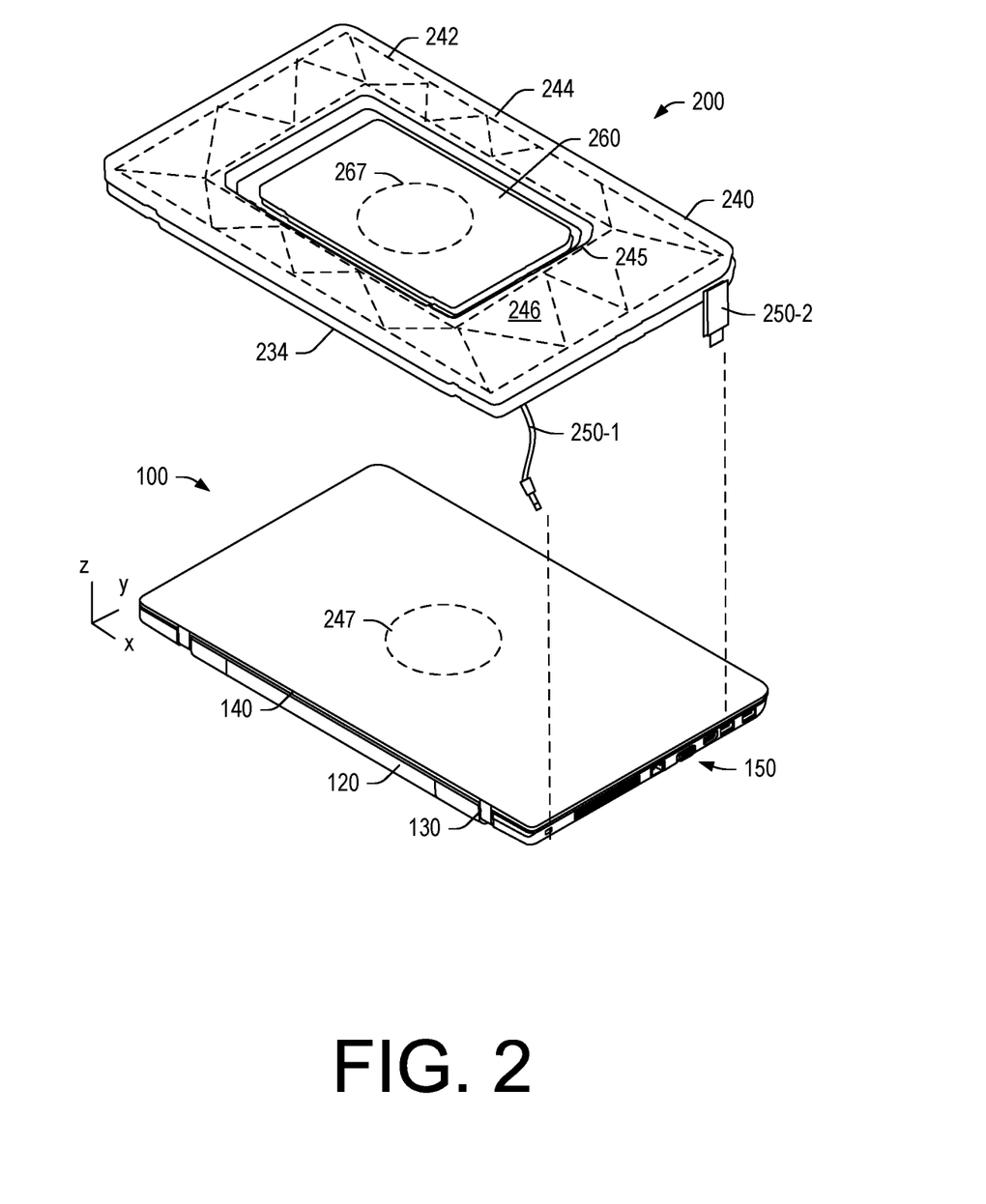
FIG. 2 is a perspective view of an example of a computing device and an example of an auxiliary power case.

FIG. 2 shows an example of the auxiliary power case 200 and the computing device 100. In the example of FIG. 2, the auxiliary power case 200 is shown as including the frame 242 (see dashed lines) that can include a lower, inwardly facing device side panel 234 and the panel 244 as an upper, outwardly facing panel. As shown, the frame 242 may include members where spaces can be provided for circuitry, etc. As an example, the members of the frame 242 may be resilient and/or rigid. As to resilient members, consider an auxiliary power case that may be foldable, for example, to reduce storage space. As an example, the auxiliary power case 200 can include at least the panel 244, which may be integrally formed or separately formed with respect to the frame 242 and/or the panel 234, if present (e.g., consider the auxiliary power case 200 being integral with a display housing, etc.). As an example, an auxiliary power case 200 may be rollable such that it can be rolled into a cylindrical shape for transport, storage, etc., which may be with or without the battery 260, depending on the configuration and/or materials of construction of the battery 260.

In the example of FIG. 2, the auxiliary power case 200 can include one or more connectors 250-1 and 250-2 that can be plugged into one of the one or more ports 150 of the computing device 100. As an example, the auxiliary power case 200 may be coupled to the housing 120 and/or the housing 140 of the computing device 100. For example, the connector 250-2 can be utilized to couple the auxiliary power case 200 to the housing 120 where the auxiliary power case 200 may be positioned underneath the computing device 100. In such an example, the housing 140 can be rotated to an open orientation via the hinge assembly 130 with interference from the connector 250-2. As an example, the connector 250-1 may be positioned closer to the hinge assembly 130 and hence a rotational axis such that an arc distance is minimal where the connector 250-1 does not interfere with rotational opening of the housing 140 with respect to the housing 120.

As explained, the computing device 100 can include the power interface 247 and the auxiliary power case 200 can include the power interface 267 such that a wired power connector is not necessarily required to transfer power and/or data. In such an example, the housing 140 may be opened or closed without interference from a cable, a connector, etc.

Figure 3:
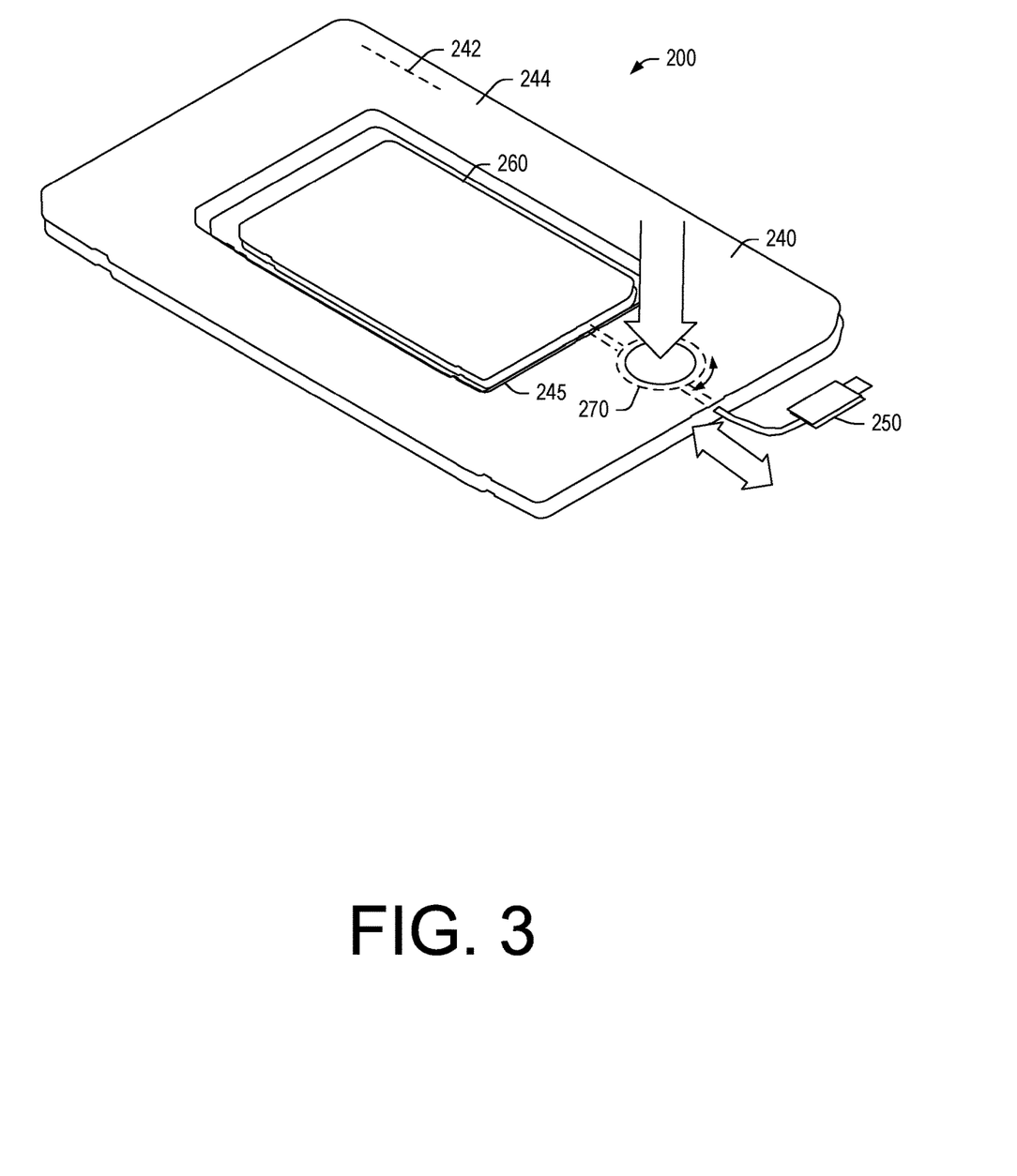
FIG. 3 is a perspective view of an example an auxiliary power case.

FIG. 3 shows an example of the auxiliary power case 200 as including a cable management component 270. For example, consider a spool that can be actuated (e.g., manually, automatically, responsive to input, etc.) to reel in and/or reel out a length of cable of the connector 250. For example, consider a button that a user may push to cause the cable management component 270 to take in a length of cable (e.g., for storage). In such an example, a push of the button may act as a release where a length of cable can be pulled out for use.

As explained, the auxiliary power case 200 can include the frame 242 and the panel 244. In the example of FIG. 3, various components may be disposed in a frame space, for example, underneath the panel 244. For example, the frame 242 may define a frame space for a reel that can take up or let out cable of the connector 250. In the example of FIG. 3, the cable of the connector 250 may be electrically coupled to an interface that can be electrically coupled to the battery 260 via wire or wirelessly (e.g., via a coil or coils, via contacts, via spring-loaded contacts, etc.).

Figure 4:
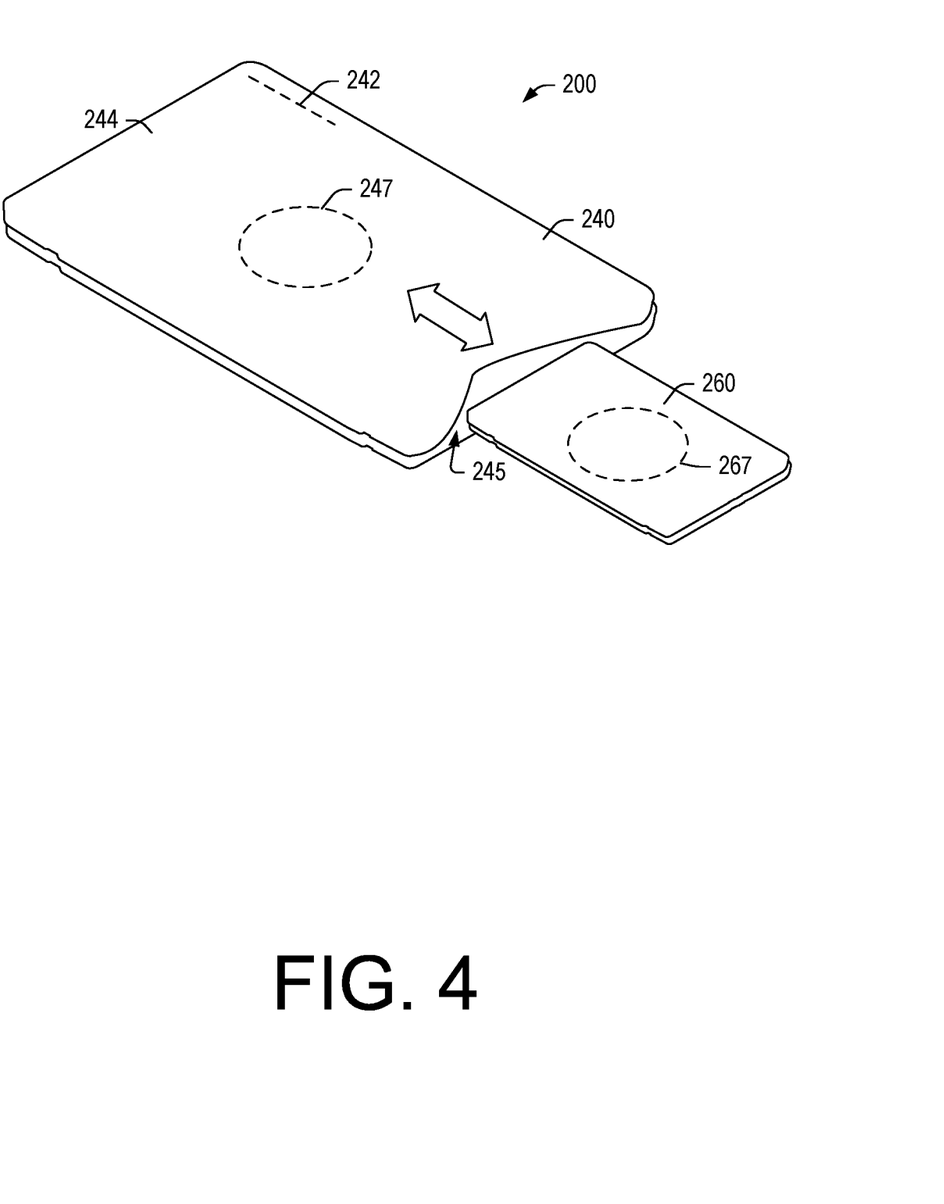
FIG. 4 is a perspective view of an example of an auxiliary power case.

FIG. 4 shows an example of the auxiliary power case 200 where the recess 245 may be formed as a pocket. For example, consider a pocket approach where a user may insert or remove the battery 260 from the recess via an opening, which may be at an edge of the auxiliary power case 200. In such an example, the panel 244 of the auxiliary power case 200 may be a flexible and/or resilient panel. In such an example, a user may position the battery 260 such that the interface 267, if included, is appropriately positioned. As an example, the auxiliary power case 200 can include an elastomeric panel that can be stretched to provide a clearance sufficient for insertion of the battery 260. For example, consider a panel (e.g., a sheet, etc.) that is made of one or more polymeric materials, which may be transparent, translucent and/or opaque, that can be stretched to generate an opening (e.g., a slit, etc.) for insertion and/or removal of the battery 260 where the panel can apply a force (e.g., a snap-back force, etc.) to help retain the battery 260 in the auxiliary power case 200.

Figure 5:
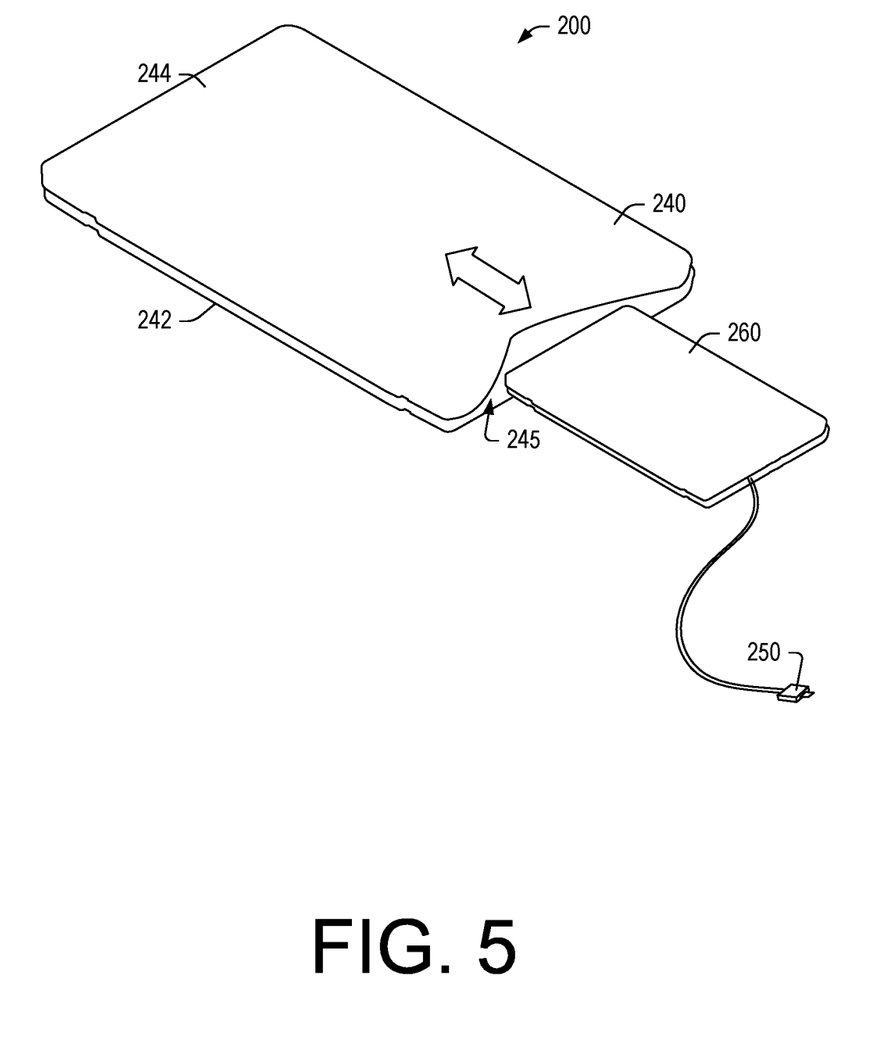
FIG. 5 is a perspective view of an example of an auxiliary power case.

FIG. 5 shows an example of the auxiliary power case 200 where the recess 245 may be formed as a pocket. For example, consider a pocket approach where a user may insert or remove the battery 260 from the recess via an opening, which may be at an edge of the auxiliary power case 200. In such an example, the panel 244 of the auxiliary power case 200 may be a flexible and/or resilient panel. In such an example, the battery 260 may include a cable with the connector 250 where at least the cable can be stored in the recess 245. In such an example, the frame 242 may be a support for the panel 244 (e.g., consider the frame 242 as being a lower panel where the lower panel and the panel 244 are connected (e.g., at edges, etc.).

Figure 6:
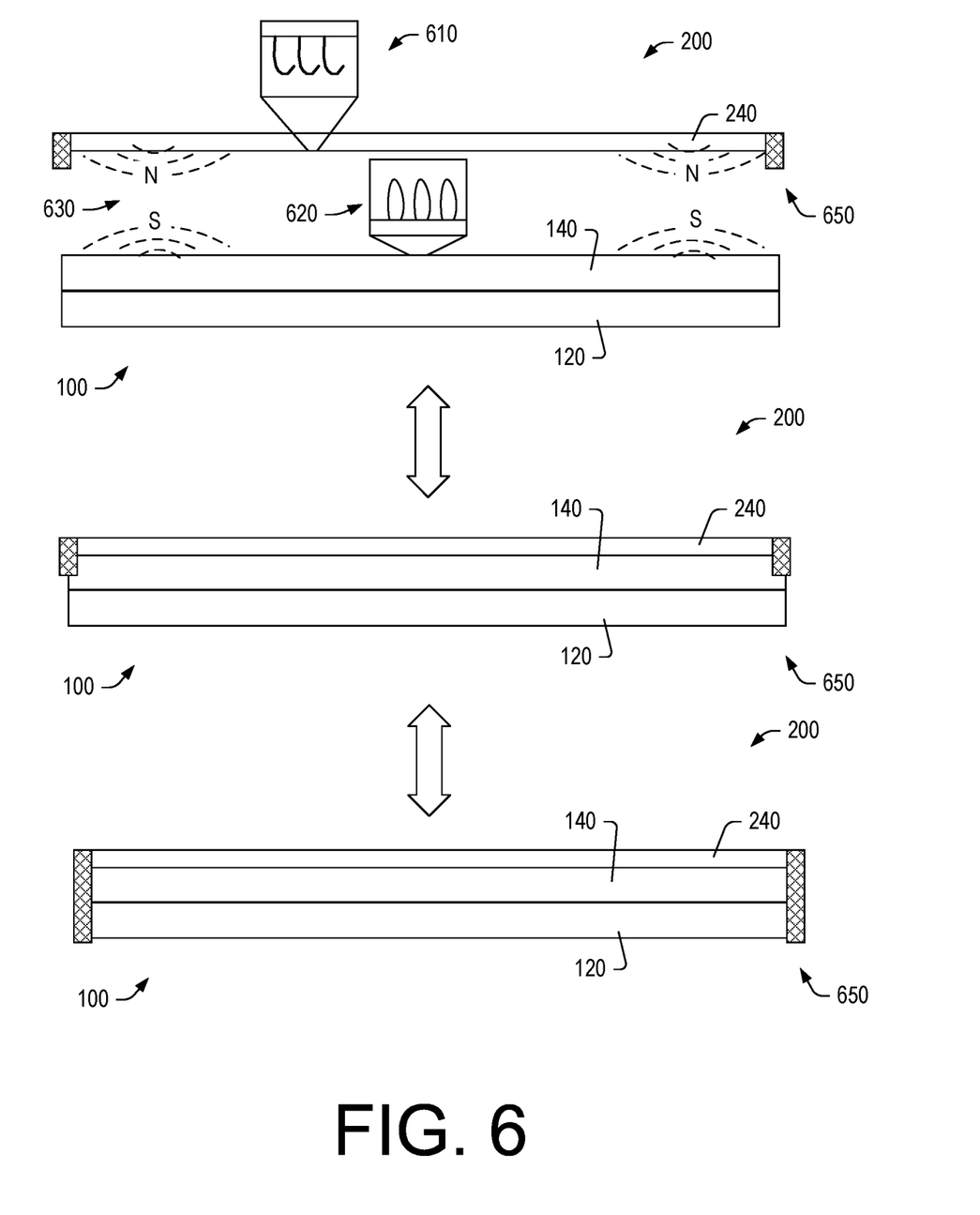
FIG. 6 is a side view of an example of a computing device and an example of an auxiliary power case.

FIG. 6 shows an example of the auxiliary power case 200 with respect to the computing device 100 along with one or more components that can provide for attachment of the auxiliary power case 200 to the computing device 100. For example, consider hooks 610 and loops 620 (e.g., VELCRO, etc.), magnetic material 630 (e.g., one or more magnets, one or more ferromagnetic materials, etc.), and/or one or more resilient couplings 650, which may be part of or form a resilient frame (e.g., part of the frame 242, etc.). As to a resilient frame, consider a stretchy frame that can be elastically deformed to fit over a portion of a housing and then released to snuggly attach to the housing. As an example, an auxiliary power case may be attached using an interference fit (e.g., a press-fit, etc.). In various examples, the auxiliary power case 200, where existing as a separate assembly that is not formed as part of a housing of a computing device, can be removably attachable.

As an example, an auxiliary power case can be a protective case for a computing device. For example, consider an auxiliary power case that can protect a display housing and a display thereof. In such an example, the auxiliary power case can include a bumper or bumpers, which may be part of an elastomeric panel, a non-elastomeric panel, an elastomeric frame, a non-elastomeric frame, an elastomeric coupling, a non-elastomeric coupling, etc. In such an example, the auxiliary power case can provide for shock-resistance in case of a fall or other contact with an object. As an example, an auxiliary power case may include a roll-down perimeter or pull-down that can protect at least an edge of a computing device that can act as a deployable component or deployable components, which may provide for coupling the auxiliary power case to a computing device. For example, consider a roll-down or pull-down perimeter that can roll-down or pull-down past a display housing to a keyboard housing such that the keyboard housing can be protected. In such an example, once rolled down or pulled down, the computing device, as a clamshell computing device, may be maintained in a closed orientation. Where a user desires to open the computing device by transitioning from the closed orientation to an open orientation, the user may roll-up or pull-up the edge. For example, consider the one or more resilient couplings 650 of the example of FIG. 6 as being roll-down or pull-down bumpers that can be deployed as desired to protect the computing device (e.g., the housing 140 and the housing 120). In such an example, the auxiliary power case can provide additional functionality, it can help protect one or more housings of a computing device (e.g., in one or more orientations, etc.) and supply auxiliary power as appropriate. As an example, such an approach may provide for two side or four side protection. For example, consider left and right side protection, front and back side protection or left, right, front and back side protection.

Figure 7:
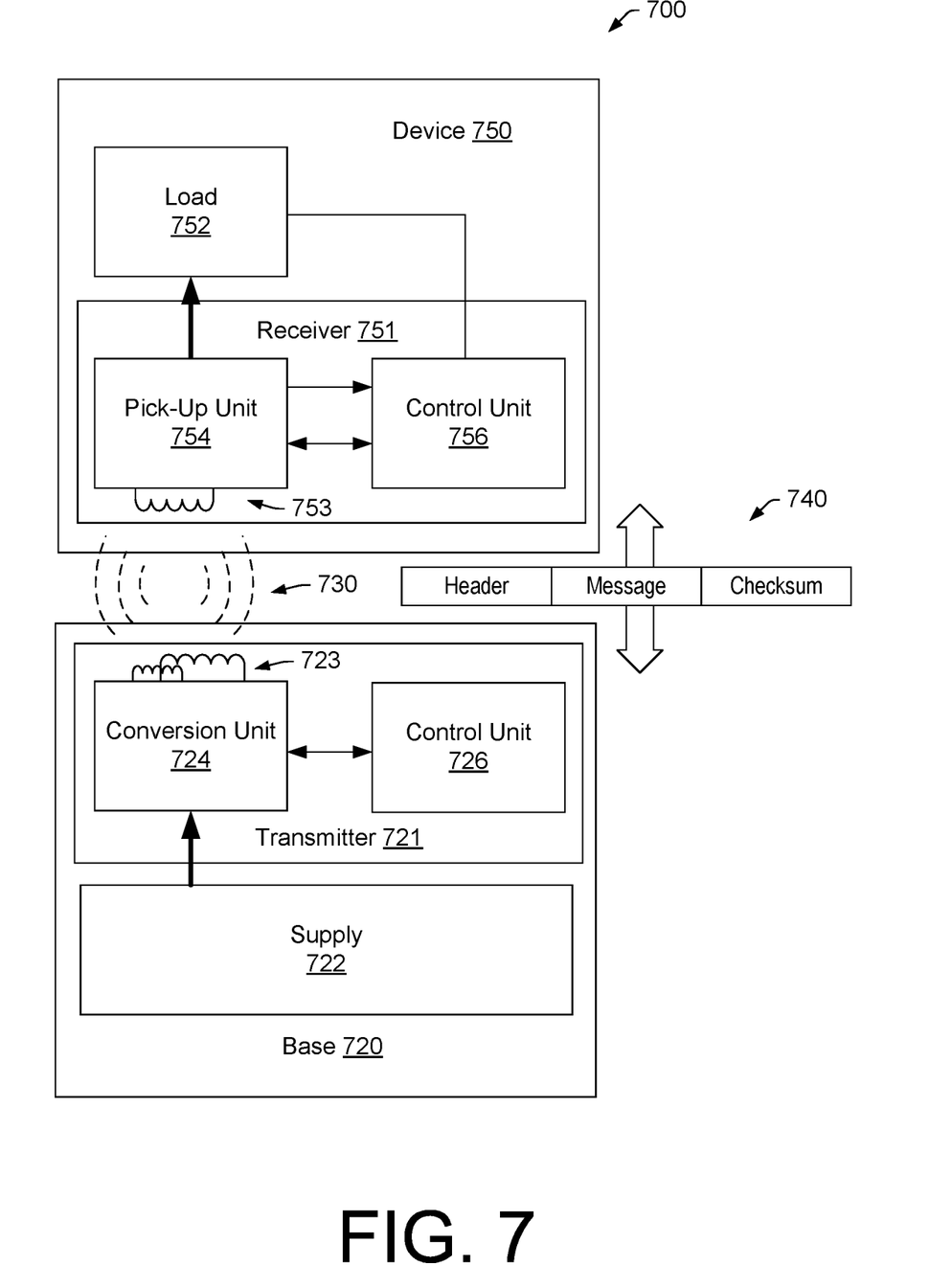
FIG. 7 is a block diagram of examples of circuitry.

FIG. 7 shows an example of a system 700 that includes a base 720 and a device 750 where the base 720 can transmit energy to the device 750, for example, to power the device 750, to store power in a battery of the device 750, etc.

As an example, the base 720 and/or the device 750 may operate according to one or more standards where compatibility exists such that energy can be transmitted from the base 720 to the device 750. As an example, consider the Qi standard. Devices that operate according to the Qi standard utilize electromagnetic induction between coils, which can be planar coils. A Qi system includes two types of devices, a base (e.g., a base station), which includes or is connected to a power source and provides inductive power, and a device such as, for example, a mobile device (e.g., a mobile phone, a mobile peripheral, etc.), which can consume inductive power provided by the base.

As shown in FIG. 7, the base 720 can include a power transmitter 721 that receives power from a supply 722 where the power transmitter 721 can include one or more transmitting coils 723 that generate an oscillating magnetic field 730 in a space. In the example of FIG. 7, the supply 722 may be one or more types of power sources, for example, consider the battery 260 of the auxiliary power case 200 as a power source.

As an example, converter circuitry may be included as part of the base 720 or separately from the base 720 where such converter circuitry can convert AC power to DC power, at a level sufficient for operation of the base 720. As an example, a cable can be provided that can electrically connect the base 720 to one or more sources of electrical power (e.g., a battery, a wall outlet, a device, etc.).

As shown, the device 750 can include a power receiver 751 that includes a receiving coil 753. In the example of FIG. 7, the magnetic field 730 can induce an alternating current in the receiving coil 753 by Faraday's law of induction. Where there is sufficiently close spacing of the coils 723 and 753 (e.g., and sufficient shielding on their surfaces), inductive power can be transferred efficiently from the base 720 to the device 750.

As to alignment of the coils 723 and 753, one technique involves guided positioning where the device 750 is placed at a certain location of the base 720. In such an example, the device 750 can provide an alignment aid that can be appropriate to its size, shape and function. Another technique can be referred to as free positioning, which does not demand placement of the device 750 with direct alignment as to the position of a transmitting coil (see, e.g., the one or more coils 723, etc.). As to free positioning, a bundle of transmitting coils may be included in a base to generate a magnetic field at a location of a receiving coil or, for example, mechanical features may move one or more transmitting coils with respect to a receiving coil or, for example, a technique involving multiple cooperative flux generators may be utilized.

Referring again to FIG. 7, the system 700 includes the power transmitter 721 with a power conversion unit 724 and a communications and control unit 726. The control and communications unit 726 can regulate transferred power to a level that a power receiver requests. While the base 720 is shown with a single transmitter, a base may include multiple transmitters (e.g., for multiple devices to be placed and inductively charged). In the system 700, the base 720 may include features for input power provisioning, user interfacing, etc.

As to the power receiver 751, it can include a power pick-up unit 754 and a communications and control unit 756. As shown, the receiving coil 753 can interact with the magnetic field 730 such that energy is transferred to the power pick-up unit 754. The communications and control unit 756 can regulate transferred power to a level that is appropriate for the device 750, for example, as illustrated by the load 752, which may be circuitry associated with one or more batteries (see, e.g., consider one or more of the batteries 160, 260, etc.) electrically connected to the output of the power receiver 751.

As an example from the 2017 version 1.2.2 of the Qi specification, the A2 reference Qi low-power transmitter has a coil of 20 turns (in two layers) in a flat coil, wound on a form with a 19 mm inner diameter and a 40 mm outer diameter, with a below-coil shield of soft iron at least 4 mm larger in diameter which gives an inductance of 24+/−1 microhenries. This coil is placed in a series resonant circuit with a 200 nF capacitor to yield a resonant circuit with a natural resonance at approximately 140 kHz when coupled to a receiver coil. This series resonant circuit is then driven by an H-bridge switching arrangement from a DC source; at full power, the voltage in the capacitor can reach 50 volts. Power control can be automatic; the Qi specification demands that actual voltage applied be controllable in steps at least as small as 50 millivolts. Rather than down-regulating the charging voltage in a device, a Qi specification charger meets the A2 reference using a PID (proportional-integral-derivative) controller to modulate delivered power according to a primary cell voltage.

Various types of Qi charge transmitters can start their connections at 140 kHz and change frequencies to find a frequency with a better match, as the mutual inductance between transmitter and receiver coils can vary according to standoff distance between transmitter and receiver coils, and thus the natural resonance frequency can vary. Various different Qi reference designs can include different coil arrangements, including oval coil and multi-coil systems as well as more complex resonance networks with multiple inductors and capacitors. Such designs may allow for frequency-agile operation at frequencies over a range, for example, from 105 to 205 kHz and with maximum resonant circuit voltages as high as, for example, 200 volts.

The Qi specification power receiver hardware reference design 1, from version 1.2.2 of the Qi specification, has a rectangular coil of wire 44 mm×30 mm outside size, with 14 turns of wire, and with an above-coil magnetic shield. This coil is wired into a parallel resonant circuit with a pair of capacitors (e.g., of 127 nanofarads and 1.6 nanofarads in series). The power output can be taken across the 1.6 nanofarad capacitor. To provide a digital communications channel back to the power transmitter, a resonance modulator that includes a pair of 22 nanofarad capacitors and a 10 kΩ resistor in a T configuration can be switched across the 1.6 nanofarad capacitor. Switching the T network across the 1.6 nanofarad capacitor can cause a change in the resonant frequency of the coupled system that is detected by the power transmitter as a change in the delivered power. Power output to a mobile device can be via a full-wave bridge wired across the 1.6 nanofarad capacitor; the power may be filtered, for example, with a 20 microfarad capacitor before delivery to a charge controller.

Various other types of Qi power receivers may use alternate resonance modulators, including switching a resistor or pair of resistors across the receiver resonator capacitor, both before and after the bridge rectifier.

FIG. 7 also shows an example of a data structure 740 that may be transmitted from the base 720 to the device 750 or vice versa. As shown, the data structure 740 can include a message (e.g., a payload) that can be prefaced by a header and optionally followed by a checksum. In such an example, the data structure 740 may include a preamble.

In the Qi standard v.1.3, the power receiver can communicate to the power transmitter using data packets. As an example, a data packet can include a preamble, a header, a message, and a checksum. In v.1.3, the preamble includes a minimum of 11 and a maximum of 25 bits, all set to 1, and encoded. The preamble enables the power transmitter to synchronize with the incoming data and accurately detect the start bit of the header. The header, message, and checksum include a sequence of three or more bytes encoded according to a byte encoding scheme. The power transmitter can consider a data packet as received correctly if: the power transmitter has detected at least 4 preamble bits that are followed by a start bit; the power transmitter has not detected a parity error in any of the bytes of the data packet (e.g., including the header byte, the message bytes, and the checksum byte); the power transmitter has detected the stop bit of the checksum byte; and the power transmitter has determined that the checksum byte is consistent. Where the power transmitter does not receive a data packet correctly, the power transmitter can discard the data packet and not use any of the information contained therein. As an example, a ping phase as well as in an identification and configuration phase, a timeout can occur, which may cause the power transmitter to remove the power signal.

As to the header, it can include a single byte that indicates the data packet type. The header may implicitly provide the size of the message contained in the data packet. The number of bytes in a message may be calculated from the value contained in the header of the data packet. A power receiver may turn off its communications modulator after transmitting a data packet, which may cause an additional HI state to LO state or LO state to HI state transition in a primary cell current.

As to a message in the Qi Standard v.1.3, the power receiver can act to ensure that the message contained in the data packet is consistent with the data packet type indicated in the header where the first byte of the message can directly follows the header.

The checksum can include a single byte that enables the power transmitter to check for transmission errors. If the calculated checksum and the checksum byte contained in the data packet are not equal, the power transmitter can determine that the checksum is inconsistent.

As explained, a computing device may utilize a wired mode and/or a wireless mode of transmission to transfer information to an auxiliary power case. As to a wireless mode, consider a mode of transmission that can utilize coils such as defined in the Qi standard. For example, a method can include transmitting a signal from a computing device to an auxiliary power case where the signal provides information that can instruct the auxiliary power case to supply power to the computing device or, for example, to stop supply of power. As an example, a code-based system may be suitable for a relatively low bandwidth mode of wireless communication. In such an example, a message may be a code where the code is utilized in combination with stored instructions. For example, consider a numeric coding system where a one, two or three digit code (e.g., or more) can be utilized. As mentioned, a signal (e.g., a trigger, etc.) may be for a temperature condition, a pressure condition, a current condition, a voltage condition, an application condition, etc. Utilization of a signal or signals (e.g., a trigger or triggers) may provide for extended battery life of a computing device and/or one or more other benefits (e.g., user experience, etc.). As explained, a computing device may include a sealed battery where utilization of a signal or signals may help to extend the life of the sealed battery. In such an example, one or more strategies may be utilized for extension of life (e.g., temperature control, minimum discharge parameters, maximum charge parameters, one or more power demand levels, etc.). As mentioned, a signal may correspond to a computing device task such as rendering (e.g., video, gaming, CAD, etc.), where a relatively large power demand may be met at least in part by a rechargeable battery of an auxiliary power case coupled to the computing device.

Figure 8:
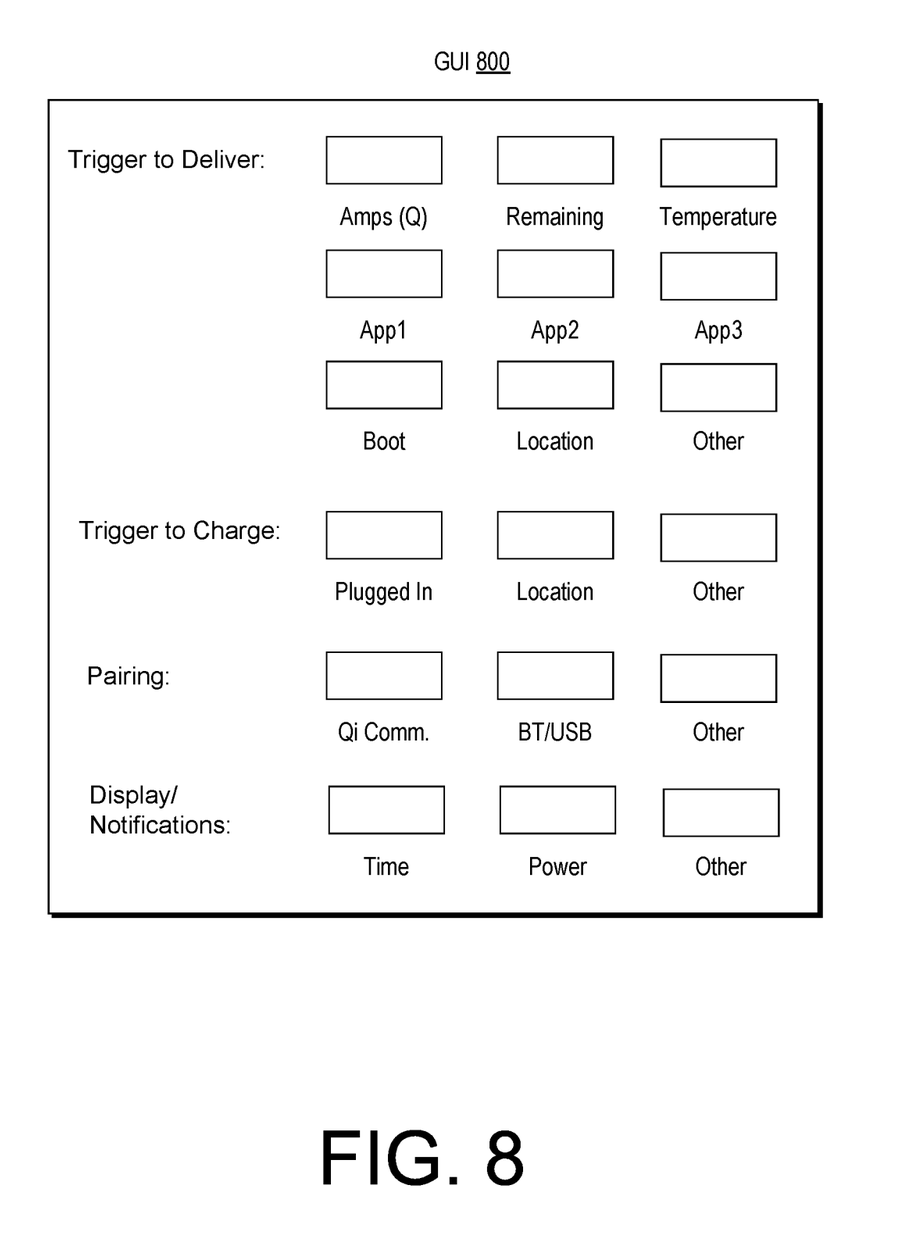
FIG. 8 is a diagram of an example of a graphical user interface.

FIG. 8 shows an example of a graphical user interface (GUI) 800 that can be a GUI such as the GUI 145 of the example of FIG. 1B. As shown, the GUI 800 can include various fields that may provide for control of various actions. Some examples of actions are shown in FIG. 8, which can include triggers for delivery of power (e.g., current, charge remaining, temperature, type of application, boot, location, other, etc.), triggers for charging (e.g., plugged-in, location, other, etc.), pairing (e.g., Qi communication, BLUETOOTH communication, USB communication, other, etc.), display and/or notifications (e.g., time, power, other, etc.). As to display and/or notifications, as mentioned, an auxiliary power case may include display that can render information, which may be received via wired and/or wireless transmission from a computing device. As an example, consider an email notification, a power status notification, a meeting notification, etc.

Figure 9:
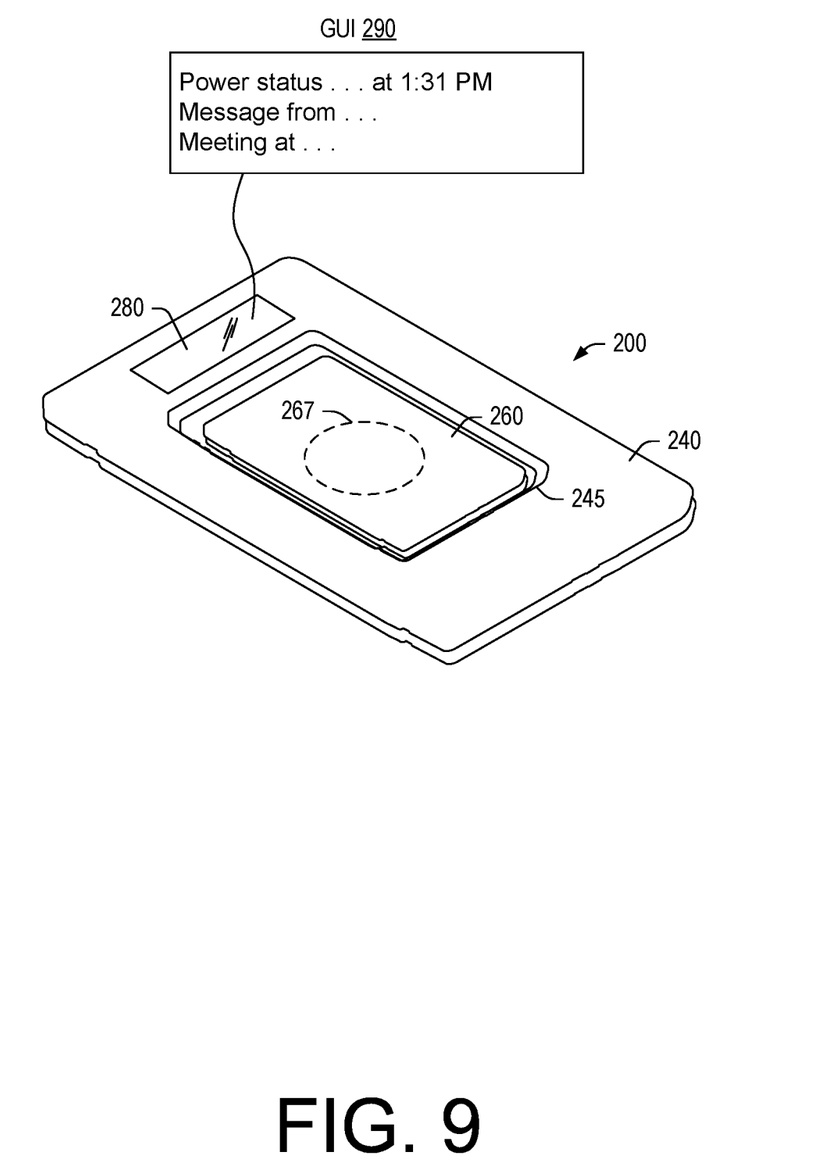
FIG. 9 is a perspective view of an example of an auxiliary power case.

FIG. 9 shows an example of the auxiliary power case 200 as including a display 280 that can render one or more GUIs 290. As shown, the GUI 290 may render a power status, a time, a message, a meeting notification, etc. As explained, such information may be received from a computing device, optionally via a wireless interface that provides for transmission of data structures with payload (e.g., triggers, information, etc.). As mentioned, a recess cover, if present, may include one or more displays that can perform one or more of the functions of the display 280.

As an example, an auxiliary power case can include a frame; a panel coupled to the frame, where the panel defines at least a portion of a recess; a rechargeable battery disposed at least in part in the recess; and a power interface operatively coupled to the rechargeable battery. In such an example, the frame can include one or more computing device housing couplings. For example, consider magnetic couplings, hook-and-loop couplings, elastomeric couplings, etc. As an example, a frame of an auxiliary power case of can include at least one resilient member. For example, consider a resilient perimeter or perimeter portions that can be stretched to fit over or clip onto a housing of a computing device.

As an example, an auxiliary power case can include a wireless power transmission interface and/or a wired power transmission interface. As an example, an auxiliary power case can include control circuitry operatively coupled to a power interface. For example, consider a control circuitry that, responsive to receipt of a signal, energizes the power interface for transmission of power from a rechargeable battery. In such an example, the signal can indicate a power status of a computing device. For example, consider the power status being that of the computing device where it corresponds to a power demand level and/or where the power status is that of the computing device where it corresponds to a battery health status. As an example, control circuitry can energize a power interface for transmission of a level of power from a rechargeable battery that corresponds to a battery health status. As an example, a power demand level can correspond to video rendering, which may be for viewing a movie, gaming, etc. For example, upon execution of an application that demands video rendering, a signal may be issued that indicates that power demand will increase or is increasing (e.g., to a higher level). In such an example, upon cessation of video rendering, a signal may be issued that indicates that power demand will decrease or is decreasing (e.g., to a lower level).

As an example, an auxiliary power case can include a display. For example, consider a display that is operatively coupled to a power interface for receipt of data. In such an example, the power interface can include a coil that receives the data wirelessly.

As an example, an auxiliary power case can include a cable and, for example, can include a cable recess for storage of the cable. As an example, an auxiliary power case can include a cable retractor. For example, consider a spring-loaded reel that can spin to take up or let out cable.

As an example, an auxiliary power case can include at least one solar cell. For example, consider a panel with one or more solar cells that can provide power to a battery and/or other circuitry.

As an example, an auxiliary power case can include a rechargeable battery that is removably replaceable without decoupling a frame of the auxiliary power case from a computing device housing. For example, consider a recess that can be accessed without removal, which may be a slit or pocket that can be accessed without removal, etc.

As an example, an auxiliary power case can include at least one permanent magnet. For example, consider a magnet that can provide for coupling to a computing device housing, a magnet that can provide for holding and/or positioning a battery or batteries, etc. As an example, an auxiliary power case can include one or more permanent magnets that can be utilized to magnetically couple the auxiliary power case to a housing of a computing device where the housing includes one or more ferromagnetic materials, which may or may not be permanent magnets.

As an example, a system can include a computing device that includes a dedicated battery, a housing and a first interface; and an auxiliary power case that includes a frame removably attachable to the housing, a rechargeable battery, control circuitry and a second interface operatively coupled to the rechargeable battery and the control circuitry, where, responsive to a signal transmitted from the first interface to the second interface, the control circuitry energizes the second interface for transmission of power of the rechargeable battery from the second interface to the first interface.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 10:
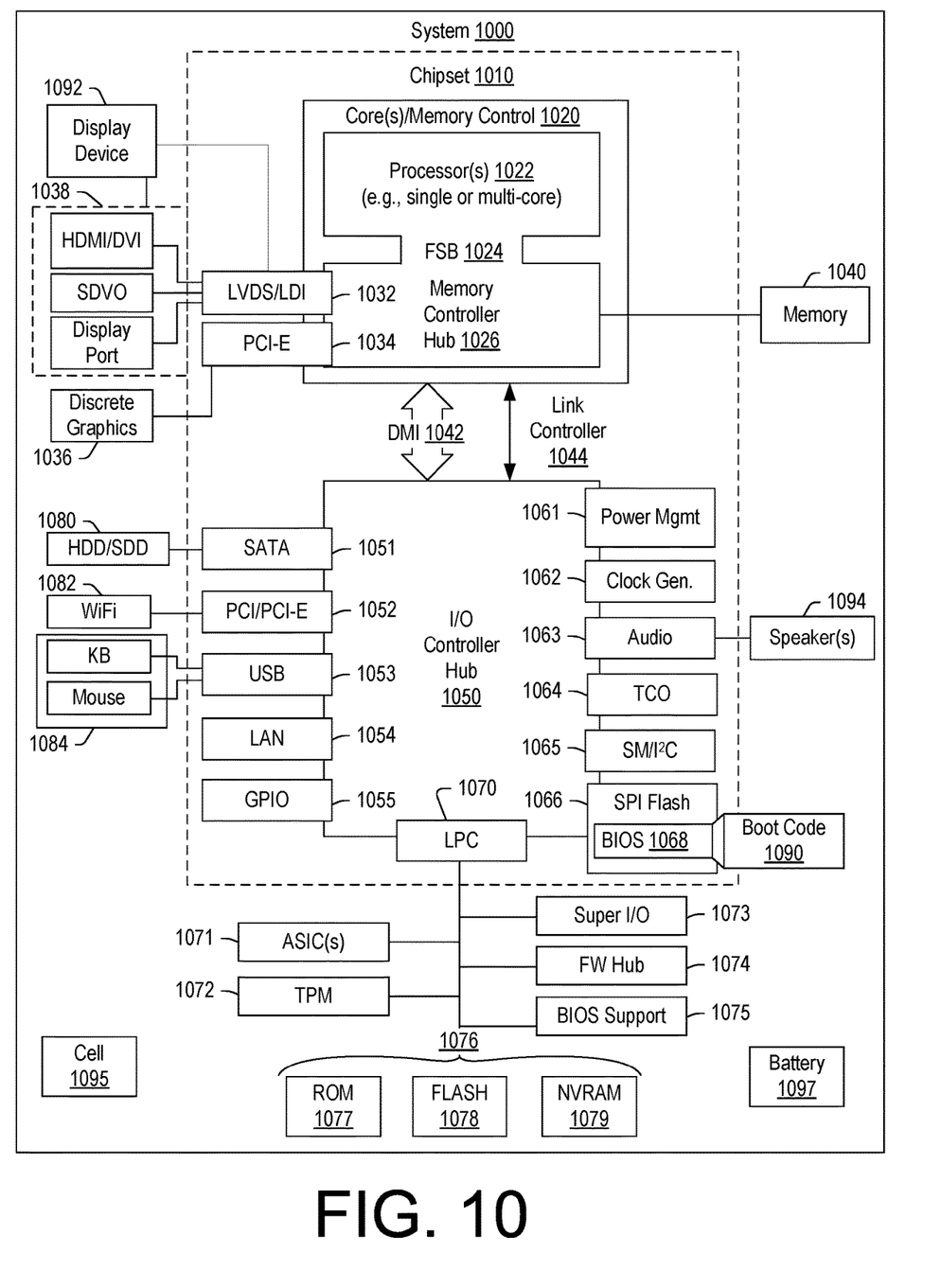
FIG. 10 is a block diagram of an example of a system that includes one or more processors and memory.

While various examples of circuits or circuitry have been discussed, FIG. 10 depicts a block diagram of an illustrative computer system 1000. The system 1000 may be a computer system, such as one of the ThinkCentre® or ThinkPad® series of personal computers sold by Lenovo (US) Inc. of Morrisville, NC, or a workstation computer system, such as the ThinkStation®, which are sold by Lenovo (US) Inc. of Morrisville, NC; however, as apparent from the description herein, a system or other machine may include other features or only some of the features of the system 1000. As an example, the computing device 100 may include at least some of the features of the system 1000.

As shown in FIG. 10, the system 1000 includes a so-called chipset 1010. A chipset refers to a group of integrated circuits, or chips, that are designed (e.g., configured) to work together. Chipsets are usually marketed as a single product (e.g., consider chipsets marketed under the brands INTEL, AMD, etc.).

In the example of FIG. 10, the chipset 1010 has a particular architecture, which may vary to some extent depending on brand or manufacturer. The architecture of the chipset 1010 includes a core and memory control group 1020 and an I/O controller hub 1050 that exchange information (e.g., data, signals, commands, etc.) via, for example, a direct management interface or direct media interface (DMI) 1042 or a link controller 1044. In the example of FIG. 10, the DMI 1042 is a chip-to-chip interface (sometimes referred to as being a link between a "northbridge" and a "southbridge").

The core and memory control group 1020 include one or more processors 1022 (e.g., single core or multi-core) and a memory controller hub 1026 that exchange information via a front side bus (FSB) 1024. As described herein, various components of the core and memory control group 1020 may be integrated onto a single processor die, for example, to make a chip that supplants the conventional "northbridge" style architecture.

The memory controller hub 1026 interfaces with memory 1040. For example, the memory controller hub 1026 may provide support for DDR SDRAM memory (e.g., DDR, DDR2, DDR3, etc.). In general, the memory 1040 is a type of random-access memory (RAM). It is often referred to as "system memory".

The memory controller hub 1026 further includes a low-voltage differential signaling interface (LVDS) 1032. The LVDS 1032 may be a so-called LVDS Display Interface (LDI) for support of a display device 1092 (e.g., a CRT, a flat panel, a projector, etc.). A block 1038 includes some examples of technologies that may be supported via the LVDS interface 1032 (e.g., serial digital video, HDMI/DVI, display port). The memory controller hub 1026 also includes one or more PCI-express interfaces (PCI-E) 1034, for example, for support of discrete graphics 1036. Discrete graphics using a PCI-E interface has become an alternative approach to an accelerated graphics port (AGP). For example, the memory controller hub 1026 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1050 includes a variety of interfaces. The example of FIG. 10 includes a SATA interface 1051, one or more PCI-E interfaces 1052 (optionally one or more legacy PCI interfaces), one or more USB interfaces 1053, a LAN interface 1054 (more generally a network interface), a general purpose I/O interface (GPIO) 1055, a low-pin count (LPC) interface 1070, a power management interface 1061, a clock generator interface 1062, an audio interface 1063 (e.g., for speakers 1094), a total cost of operation (TCO) interface 1064, a system management bus interface (e.g., a multi-master serial computer bus interface) 1065, and a serial peripheral flash memory/controller interface (SPI Flash) 1066, which, in the example of FIG. 10, includes BIOS 1068 and boot code 1090. With respect to network connections, the I/O hub controller 1050 may include integrated gigabit Ethernet controller lines multiplexed with a PCI-E interface port. Other network features may operate independent of a PCI-E interface.

The interfaces of the I/O hub controller 1050 provide for communication with various devices, networks, etc. For example, the SATA interface 1051 provides for reading, writing or reading and writing information on one or more drives 1080 such as HDDs, SDDs or a combination thereof. The I/O hub controller 1050 may also include an advanced host controller interface (AHCI) to support one or more drives 1080. The PCI-E interface 1052 allows for wireless connections 1082 to devices, networks, etc. The USB interface 1053 provides for input devices 1084 such as keyboards (KB), one or more optical sensors, mice and various other devices (e.g., microphones, cameras, phones, storage, media players, etc.). On or more other types of sensors may optionally rely on the USB interface 1053 or another interface (e.g., I²C, etc.). As to microphones, the system 1000 of FIG. 10 may include hardware (e.g., audio card) appropriately configured for receipt of sound (e.g., user voice, ambient sound, etc.).

In the example of FIG. 10, the LPC interface 1070 provides for use of one or more ASICs 1071, a trusted platform module (TPM) 1072, a super I/O 1073, a firmware hub 1074, BIOS support 1075 as well as various types of memory 1076 such as ROM 1077, Flash 1078, and non-volatile RAM (NVRAM) 1079. With respect to the TPM 1072, this module may be in the form of a chip that can be used to authenticate software and hardware devices. For example, a TPM may be capable of performing platform authentication and may be used to verify that a system seeking access is the expected system.

The system 1000, upon power on, may be configured to execute boot code 1090 for the BIOS 1068, as stored within the SPI Flash 1066, and thereafter processes data under the control of one or more operating systems and application software (e.g., stored in system memory 1040). An operating system may be stored in any of a variety of locations and accessed, for example, according to instructions of the BIOS 1068. Again, as described herein, a satellite, a base, a server or other machine may include fewer or more features than shown in the system 1000 of FIG. 10. Further, the system 1000 of FIG. 10 is shown as optionally include cell phone circuitry 1095, which may include GSM, CDMA, etc., types of circuitry configured for coordinated operation with one or more of the other features of the system 1000. Also shown in FIG. 10 is battery circuitry 1097, which may provide one or more battery, power, etc., associated features (e.g., optionally to instruct one or more other components of the system 1000). As an example, a SMBus may be operable via a LPC (see, e.g., the LPC interface 1070), via an I²C interface (see, e.g., the SM/I²C interface 1065), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An auxiliary power case comprising:
   a frame;
   a panel coupled to the frame, wherein the panel defines at least a portion of a recess;
   a rechargeable battery disposed at least in part in the recess;
   a power interface operatively coupled to the rechargeable battery; and
   control circuitry operatively coupled to the power interface, wherein the control circuitry operates according to triggers, wherein the triggers comprise triggers set via fields of a graphical user interface that control delivery of power via the power interface and triggers that control charging of the rechargeable battery, and wherein the triggers that control delivery of power comprise at least one application specific trigger that responds to receipt of a signal indicating execution of a corresponding application.

2. The auxiliary power case of claim 1, wherein the frame comprises a computing device housing coupling.

3. The auxiliary power case of claim 1, wherein the frame comprises at least one resilient member.

4. The auxiliary power case of claim 1, wherein the power interface comprises a wireless power transmission interface.

5. The auxiliary power case of claim 1, wherein the control circuitry, responsive to receipt of a signal associated with one of the triggers that control delivery of power, energizes the power interface for transmission of power from the rechargeable battery.

6. The auxiliary power case of claim 5, wherein the signal associated with one of the triggers that control delivery of power indicates a power status of a computing device.

7. The auxiliary power case of claim 6, wherein the power status of the computing device corresponds to a power demand level.

8. The auxiliary power case of claim 6, wherein the power status of the computing device corresponds to a battery health status.

9. The auxiliary power case of claim 8, wherein the control circuitry energizes the power interface for transmission of a level of power from the rechargeable battery that corresponds to the battery health status.

10. The auxiliary power case of claim 1, wherein the at least one application specific trigger corresponds to an application that performs video rendering, wherein the application that performs video rendering comprises a media application, a gaming application, or a computer aided design application.

11. The auxiliary power case of claim 1, comprising a display.

12. The auxiliary power case of claim 11, wherein the display is operatively coupled to the power interface for receipt of data.

13. The auxiliary power case of claim 12, wherein the power interface comprises a coil that receives the data wirelessly.

14. The auxiliary power case of claim 1, comprising a cable.

15. The auxiliary power case of claim 14, comprising a cable recess for storage of the cable.

16. The auxiliary power case of claim 1, comprising at least one solar cell.

17. The auxiliary power case of claim 1, wherein the rechargeable battery is removably replaceable without decoupling the frame from a computing device housing.

18. The auxiliary power case of claim 1, comprising at least one permanent magnet.

19. A system comprising:

a computing device that comprises a dedicated battery, a housing, a display, display circuitry, and a first interface; and an auxiliary power case that comprises a frame removably attachable to the housing, a rechargeable battery, control circuitry and a second interface operatively coupled to the rechargeable battery and the control circuitry, wherein the control circuitry operates according to triggers, wherein the triggers comprise triggers set via fields of a graphical user interface that control delivery of power via the second interface and triggers that control charging of the rechargeable battery, and wherein the triggers that control delivery of power comprise at least one application specific trigger that responds to receipt of a signal indicating execution of a corresponding application by the computing device.

20. The system of claim 19, wherein the graphical user interface is renderable to the display via the display circuitry.

* * * * *